US008666406B2

(12) United States Patent
Dhodapkar

(10) Patent No.: US 8,666,406 B2
(45) Date of Patent: Mar. 4, 2014

(54) GESTURE-BASED COMMANDS FOR A GROUP COMMUNICATION SESSION ON A WIRELESS COMMUNICATIONS DEVICE

(75) Inventor: Chinmay S. Dhodapkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/106,269

(22) Filed: May 12, 2011

(65) Prior Publication Data

US 2012/0289227 A1 Nov. 15, 2012

(51) Int. Cl.
*H04W 4/00* (2009.01)
(52) U.S. Cl.
USPC ........ 455/435.1; 455/518; 455/519; 455/90.2
(58) Field of Classification Search
USPC .............................. 455/435.1, 518, 519, 90.2
See application file for complete search history.

(56) References Cited

U.S. PATENT DOCUMENTS

| 7,957,756 | B2* | 6/2011 | Cai et al. ..................... 455/518 |
| 8,107,947 | B1* | 1/2012 | Martin ......................... 455/420 |
| 8,255,810 | B2* | 8/2012 | Moore et al. .................. 715/752 |
| 2005/0124365 | A1 | 6/2005 | Balasuriya et al. |
| 2005/0245203 | A1 | 11/2005 | Vance |
| 2006/0025166 | A1* | 2/2006 | Dang et al. ..................... 455/518 |
| 2009/0009588 | A1 | 1/2009 | Shaffer et al. |
| 2009/0054107 | A1 | 2/2009 | Feland, III |
| 2009/0076827 | A1 | 3/2009 | Bulitta et al. |
| 2009/0215410 | A1 | 8/2009 | Cai et al. |
| 2010/0167715 | A1 | 7/2010 | Domene et al. |
| 2010/0246571 | A1 | 9/2010 | Geppert et al. |
| 2010/0251177 | A1 | 9/2010 | Geppert et al. |
| 2010/0304729 | A1 | 12/2010 | Sabotta et al. |
| 2011/0312349 | A1* | 12/2011 | Forutanpour et al. ......... 455/466 |

OTHER PUBLICATIONS

3GPP TR 23.979, V10.0.0 (Mar. 2011) "3rd Generation Partnership Project; Technical Specification Group Services and System Aspects; 3GPP enablers for Open Mobile Alliance (OMA); Push-to-talk over Cellular (PoC) services; Stage 2 (Release 10)", 3GPP Standard; 3GPP TR 23.979, 3rd Generation Partnership Project (3GPP), Mobile Competence Centre ; 650, Route Des Lucioles ; F-06921 Sophia-Antipolis Cedex ; France, No. V10.0.0, Mar. 29, 2011, pp. 1-38, XP050476497.
International Search Report and Written Opinion—PCT/US2012/037574—ISA/EPO—Dec. 19, 2012.

* cited by examiner

*Primary Examiner* — Temica M Beamer
(74) *Attorney, Agent, or Firm* — Raphael Freiwirth

(57) ABSTRACT

In an embodiment, a user equipment (UE) detects that a user has made a pre-defined gesture that is associated with setting up a group communication session (GCS) with a communication group. The UE transmits a call request message to an application server to request set-up of the GCS. In another embodiment, the UE receives a user input requesting the UE to monitor for gestures by a user of the UE during the GCS. The UE then monitors one or more sensors during the GCS to detect whether the user of the UE has made a pre-defined gesture. In another embodiment, during the GCS, the UE detects that the user has made a pre-defined gesture, maps the detected gesture to a gesture-based command associated with transitioning the UE's floor-holder status and then transmits a request to facilitate the floor-holder status transition to the application server in accordance with the gesture-based command.

136 Claims, 9 Drawing Sheets

GESTURE-BASED COMMANDS FOR A GROUP COMMUNICATION SESSION ON A WIRELESS COMMUNICATIONS DEVICE

BACKGROUND OF THE INVENTION

1. Field of the Invention

Embodiments relate to gesture-based commands for a group communication session on a wireless communications device.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a user equipment (UE) detects that a user has made a pre-defined gesture that is associated with setting up a group communication session (GCS) with a communication group. The UE transmits a call request message to an application server to request set-up of the GCS. In another embodiment, the UE receives a user input requesting the UE to monitor for gestures by a user of the UE during the GCS. The UE then monitors one or more sensors during the GCS to detect whether the user of the UE has made a pre-defined gesture. In another embodiment, during the GCS, the UE detects that the user has made a pre-defined gesture, maps the detected gesture to a gesture-based command associated with transitioning the UE's floor-holder status and then transmits a request to facilitate the floor-holder status transition to the application server in accordance with the gesture-based command.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
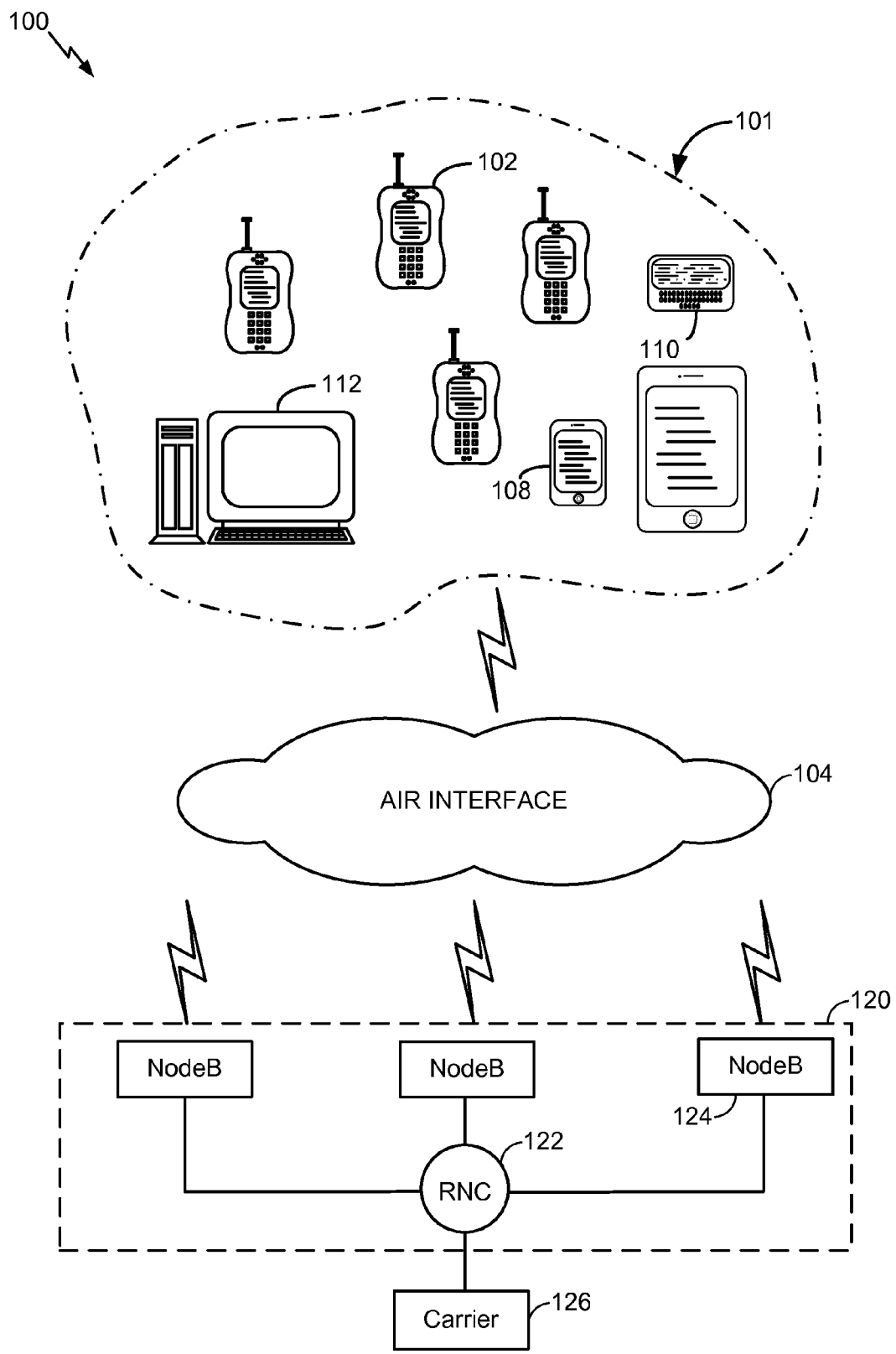
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
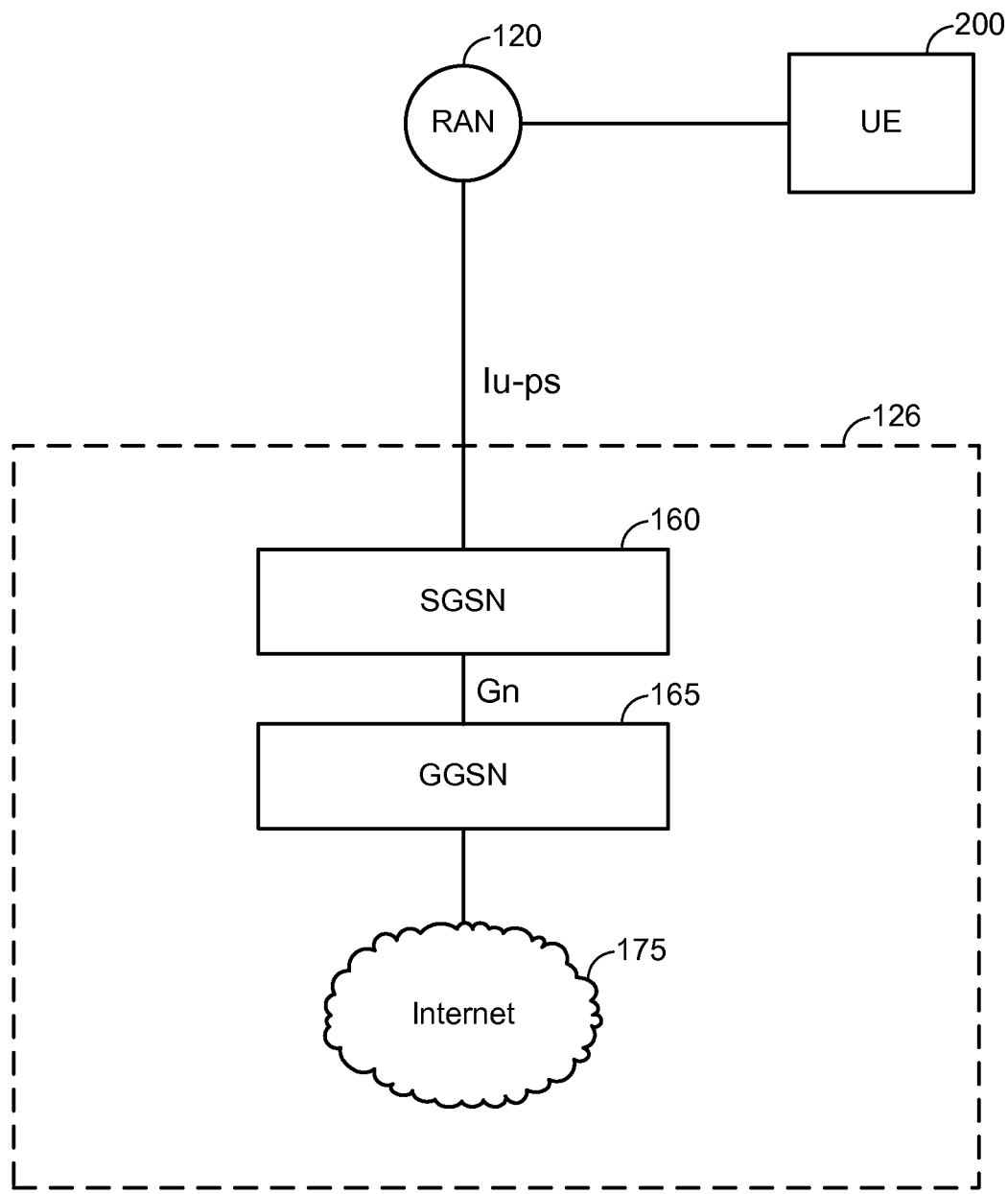
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
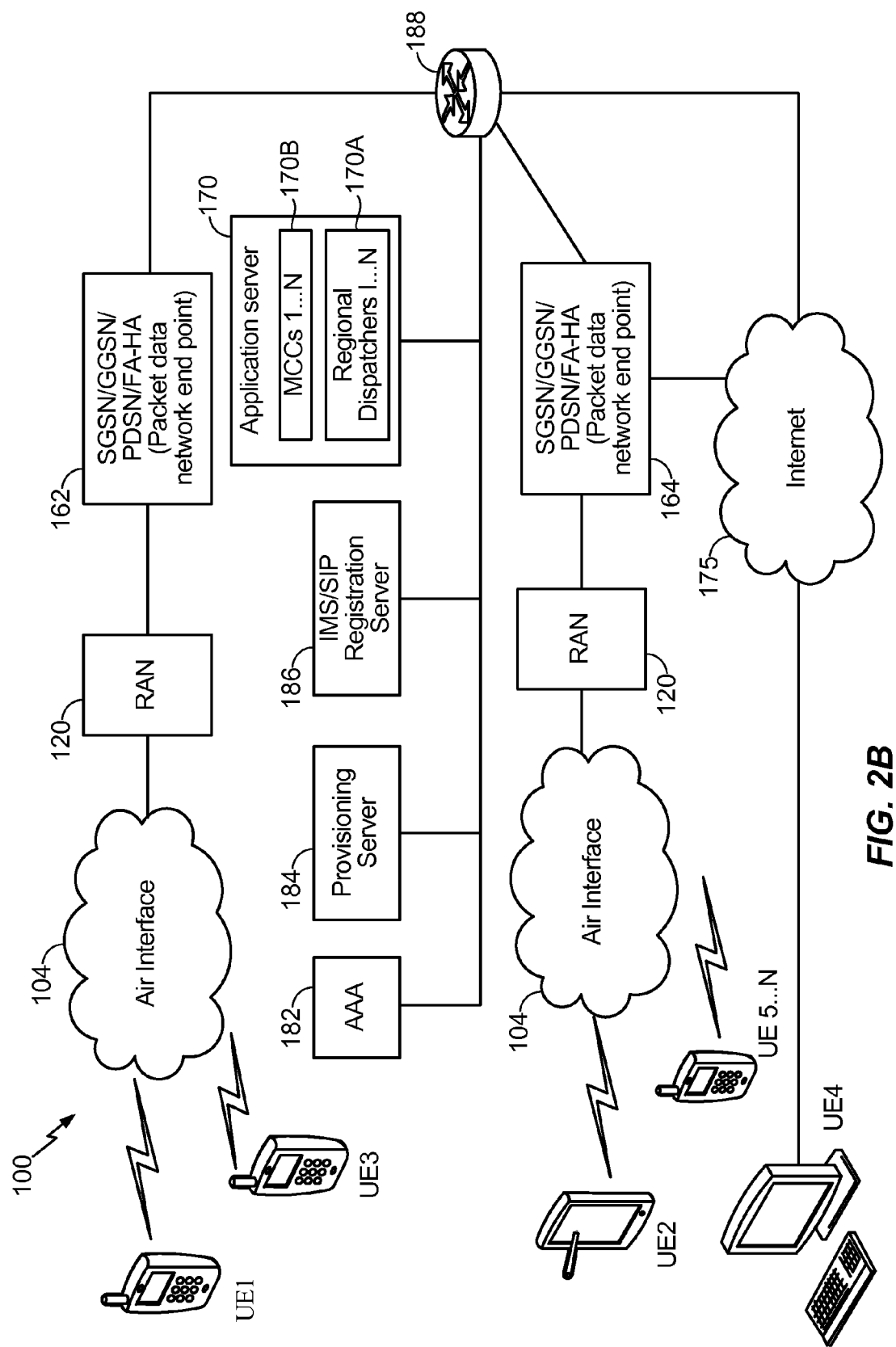
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 ... N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 ... N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
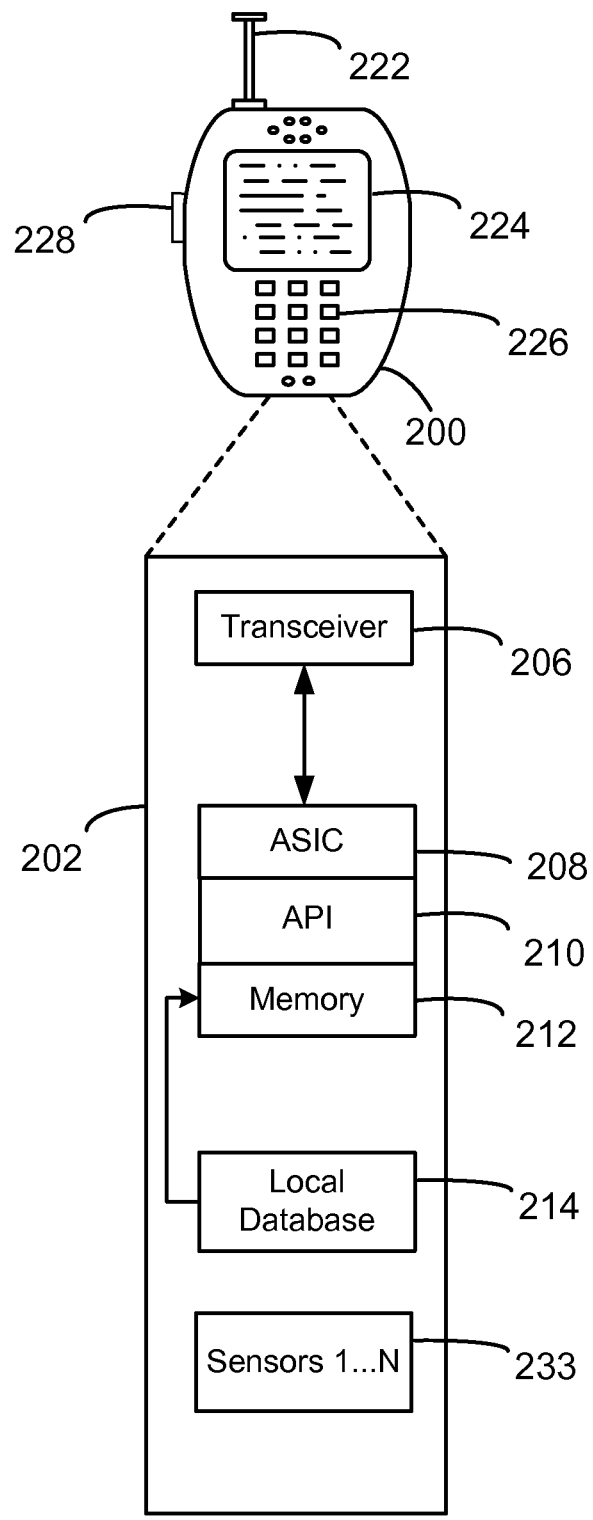
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Referring to FIG. 3, UE 200 further includes a plurality of sensors 1 . . . N, 233. The sensors 233 are coupled to the components of the platform 202, and are configured to detect one or more pre-defined gestures made with UE 200 by a user. As used herein, a pre-defined gesture corresponds to one or more actions initiated by a user of the mobile device (e.g., the user flicks his/her wrist while holding UE 200, the user places UE 200 into his/her pocket or backpack, the user places UE 200 removes UE 200 from his/her pocket or backpack, etc.). The sensors 1 . . . N 233 provide sensor measurement data to an API on UE 200 that is configured to compare the sensor measurement data with a set of sensor data profiles to determine whether the sensor measurement data matches any of the sensor data profiles. As will be described below in more detail, if a match is found, the pre-defined gesture is said to be detected, and a gesture-based command associated with the matching sensor profile can then be executed by UE 200. The sensor profiles against which the sensor measurement data is compared can either be preset or built-into the API that detects the pre-defined gestures, or alternatively the API can dynamically form new sensor profiles in a 'learning' mode whereby the UE 200 performs a gesture and the sensors 1 . . . N 233 are used to build or generate a sensor profile that corresponds to the gesture made by the user while in learning mode.

In an embodiment, the sensors 1 . . . N 233 can include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user flicks his/her wrist while holding UE 200, (b) the user walking or jogging with the UE 200, (c) the user picking up UE 200 from a surface or storage location, (d) the user placing UE 200 onto a surface or into a storage location, (e) the user shakes UE 200, and/or (f) a proximity of the user's fingers being close to a display of UE 200.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

- In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

- In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

- In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

- In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

DTCH to Transport Channel mappings in RRC connected mode

| | RACH | FACH | DCH | E-DCH | HS-DSCH |
|---|---|---|---|---|---|
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

In conventional Push-to-Talk (PTT) communication sessions supported upon UEs or cellular telephones, a dedicated PTT button is used to trigger a number of call set-up and in-call functions, such as (i) initiating a PTT call, (ii) answering an announced PTT call, (iii) requesting the floor for a PTT call and/or (iv) releasing the floor for the PTT call.

While the PTT button is typically implemented as a dedicated physical button, newer phones (e.g., Android-based phones, the iPhone as shown in FIG. 1 at 108, etc.) are relying more heavily upon touch-screen interfaces. Thus, PTT clients implemented on touch-screen based phones can support the functionality of a dedicated PTT button via a soft-key or touch-screen button. However, these 'virtual' PTT buttons have been found to be less desirable in certain respects as compared to the dedicated physical PTT buttons. For example, power consumption of the UE increases when its display or screen is maintained in an on-state in order to receive indications that the user has pressed the virtual PTT button, the user interface is more cumbersome (e.g., the user must actually look at the UE's display to figure out where the virtual PTT button is positioned instead of simply 'feeling' a tactile physical button with his/her finger, the user must navigate to a screen where the virtual PTT button is presented, etc.) and there is more latency detecting inputs to a virtual PTT button as compared to a dedicated physical PTT button.

Figure 4:
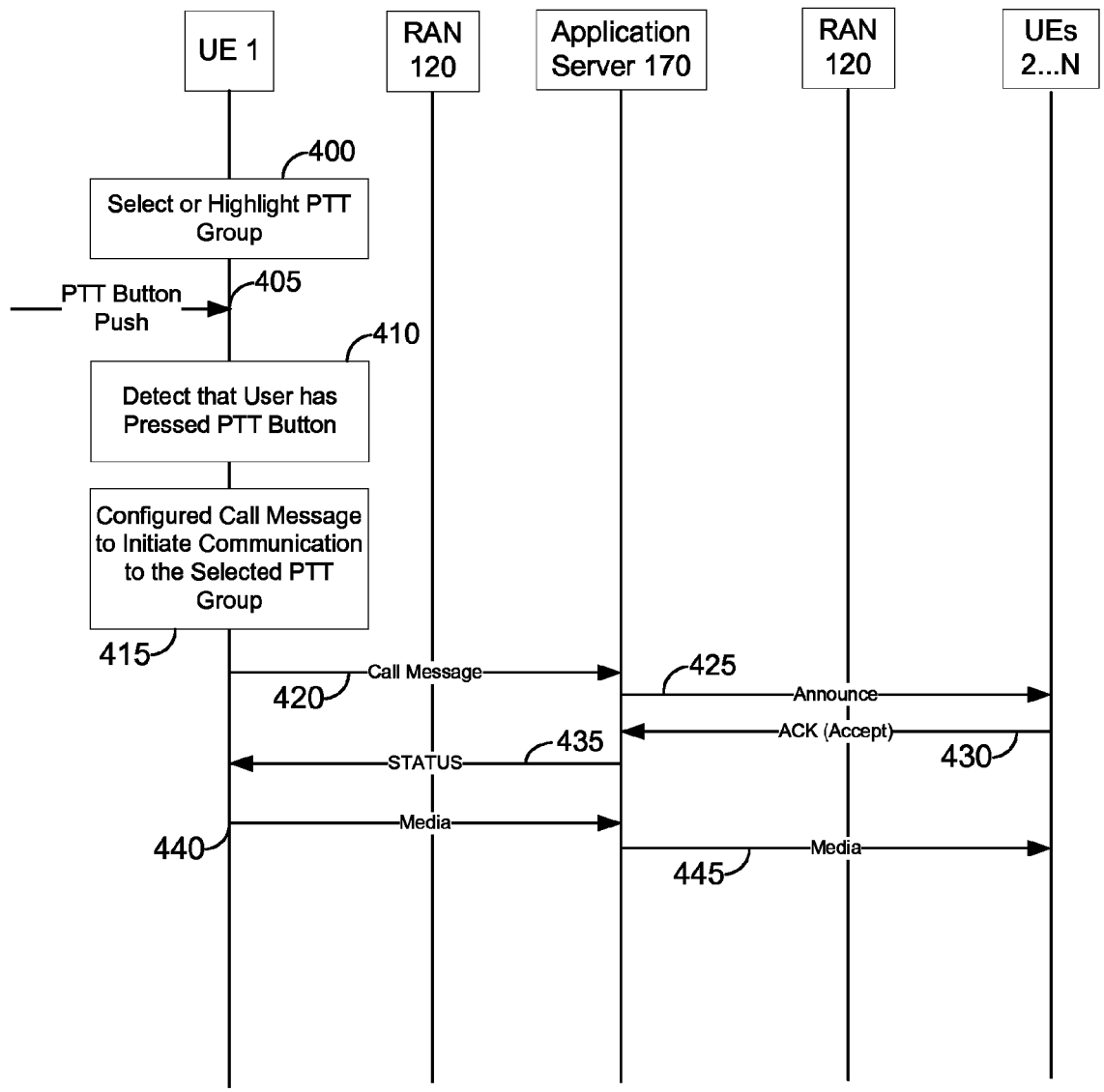
FIG. 4 illustrates a process of setting-up a conventional PTT session whereby a user of an originating UE ("UE 1") uses a dedicated or virtual PTT button to initiate the PTT session.

FIG. 4 illustrates a process of setting-up a conventional PTT session whereby a user of an originating UE ("UE 1") uses a dedicated or virtual PTT button to initiate the PTT session. Referring to FIG. 4, a user of UE 1 navigates through his/her contact list in order to select or highlight a particular PTT group or contact, 400. For example, in 400, the user of UE 1 can scroll through a menu until reaching a desired PTT group, although it is also possible that the user of UE 1 inputs a PTT group ID (e.g., a phone number) directly into UE 1.

Upon selecting the PTT group in 400, the user of UE 1 pushes a dedicated or virtual PTT button on UE 1 to indicate his/her desire to initiate a PTT session with the selected PTT group, 405. UE 1 detects that the user has pressed the PTT button in 410, and UE 1 then configures a call message that is configured to request initiation of a PTT session with the selected PTT group by the application server 170, 415. UE 1 sends the call message to the RAN 120, which then forwards the call message to the application server 170, 420. The application server 170 receives the call message from UE 1, identifies and locates the target UEs 2 ... N associated with the PTT session to be initiated, and then announces the PTT session to the target UEs 2 ... N, 425.

Referring to FIG. 4, assume that at least one of target UEs 2 ... N sends a message back to the application server 170 to acknowledge and accept the announced PTT session, 430. The application server 170 sends an indication to UE 1 that the PTT session is now active or connected and that UE 1 holds the floor, 435. UE 1 begins transmitting media in association with the PTT session in 440, and the application server 170 forwards UE 1's media to the target UEs 2 . . . N, 445.

Figure 5:
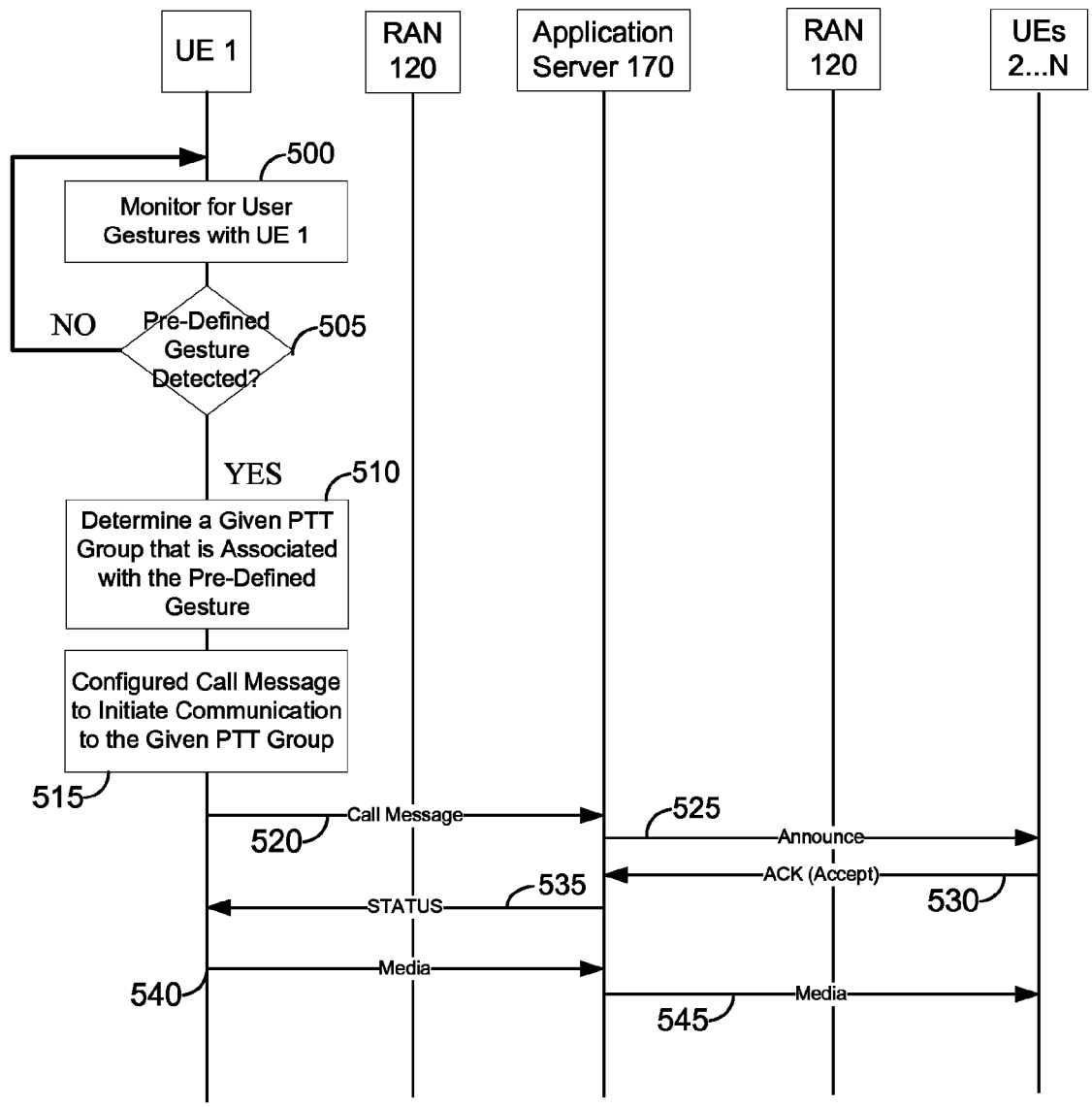
FIG. 5 illustrates a process of setting-up a PTT session in accordance with an embodiment of the invention.

FIG. 5 illustrates a process of setting-up a PTT session in accordance with an embodiment of the invention. In FIG. 5, a user of an originating UE ("UE 1") gestures with UE 1 in order to prompt UE 1 to set-up a PTT session with a particular PTT group. Accordingly, UE 1 may be configured as discussed above with respect to UE 200 of FIG. 3, such that UE 1 is provisioned with sensors 1 . . . N 233 which can be used to facilitate a detection of gestures made by the user of UE 1.

Referring to FIG. 5, assume that UE 1 is operating in a state whereby one or more of sensors 1 . . . N 233 are activated and are being used to monitor for gestures by the user of UE 1, 500. In an example, UE 1 may operate in a low-power mode whereby the sensors 1 . . . N 233 are active while other components, such as an application processor and/or a display of UE 1, are powered down. As noted above, the gestures that are being monitored in 500 may include (a) the user flicking his/her wrist while holding UE 1, (b) the user walking or jogging with the UE 1, (c) the user picking up UE 1 from a surface or storage location, (d) the user placing UE 1 onto a surface or into a storage location, (e) the user shaking UE 1, and/or (f) a proximity of the user's fingers being close to a display of UE 1.

Also, the pre-defined gestures that UE 1 is configured to detect at 500 can be either user-defined gestures or preset gestures that are pre-loaded in association with a multimedia application or client configured to manage UE 1's PTT sessions. In the case of user-defined gestures, the user of UE 1 can either select a subset of available preset gestures (more specifically, sensor data profiles corresponding to the gestures) through the multimedia client and select commands to be associated with each gesture in the subset. Alternatively, prior to setting up the PTT session, the user of UE 1 can engage a learning mode or training mode whereby the user of UE 1 performs a custom gesture while one or more of sensors 1 . . . N 233 are activated. The multimedia client can then generate a sensor data profile of the custom gesture to be associated with a particular gesture-based command (e.g., initiate PTT session with PTT group #3, initiate PTT session with currently highlighted or selected PTT group, etc.), and can thereafter compare current sensor measurement data against the sensor data profile to determine when the user makes the custom gesture. Similarly, with respect to the preset or default gestures that are built into the multimedia client, each preset or default gesture can be associated with a particular sensor data profile to be compared against current sensor measurement data to determine when the user makes the preset or default gesture.

Based on the monitoring via the sensors 1 . . . N 233 of 500, UE 1 determines whether the sensors 1 . . . N 233 have detected that the user of UE 1 has made one of a plurality of pre-defined gestures, 505. If UE 1 determines that the user of UE 1 has not made one of the plurality of pre-defined gestures in 505, the process returns to 500 and UE 1 continues to monitor for a detection of one of the plurality of pre-defined gestures. Otherwise, if UE 1 determines that the user of UE 1 has made one of the plurality of pre-defined gestures in 505, UE 1 determines a given PTT group that is associated with the detected pre-defined gesture, 510.

With respect to 510 of FIG. 5, in an example, the determination of 510 may be based exclusively upon the detected pre-defined gesture. For example, the pre-defined gesture detected at 505 may be mapped to a gesture-based command for initiating a PTT session with a particular PTT group, such that the PTT group is determined at 510 based solely upon the detection (e.g., as opposed to requiring the user to separately select or highlight the PTT group to be called). In another example, the pre-defined gesture detected at 505 may be mapped to a gesture-based command for initiating a PTT session but may not necessarily be PTT-group specific. In this case, the determination of 510 may be the result of a secondary PTT group indication. For example, the user of UE 1 may have already scrolled or highlighted to a particular PTT group and then made the gesture, detected at 505, in order to trigger UE 1 to call the highlighted or selected PTT group.

Referring to FIG. 5, after detecting the pre-defined gesture at 505 and determining the given PTT group to call in 510, UE 1 configures a call message to request initiation of a PTT session with the given PTT group by the application server 170, 515. UE 1 sends the call message to the RAN 120, which then forwards the call message to the application server 170, 520. The application server 170 receives the call message from UE 1, identifies and locates the target UEs 2 . . . N associated with the PTT session to be initiated, and then announces the PTT session to the target UEs 2 . . . N, 525.

Referring to FIG. 5, assume that at least one of target UEs 2 . . . N sends a message back to the application server 170 to acknowledge and accept the announced PTT session, 530. The application server 170 sends an indication to UE 1 that the PTT session is now active or connected and that UE 1 holds the floor, 535. UE 1 begins transmitting media in association with the PTT session in 540, and the application server 170 forwards UE 1's media to the target UEs 2 . . . N, 545.

While FIG. 5 is directed to a process of setting-up or initiating a PTT session based upon a detection of a pre-defined gesture by a user of an originating UE, other embodiments are directed to in-call gesture-recognition so that in-call functions can be controlled by users participating in a PTT session with gestures instead of relying solely upon interaction with a dedicated or virtual PTT button and/or screen menu. In particular, FIG. 6 illustrates a process of activating in-call gesture-recognition for a PTT session, whereas FIGS. 7A-7B illustrate processes by which a user controls floor-transfers via in-call gestures during a PTT session.

Figure 6:
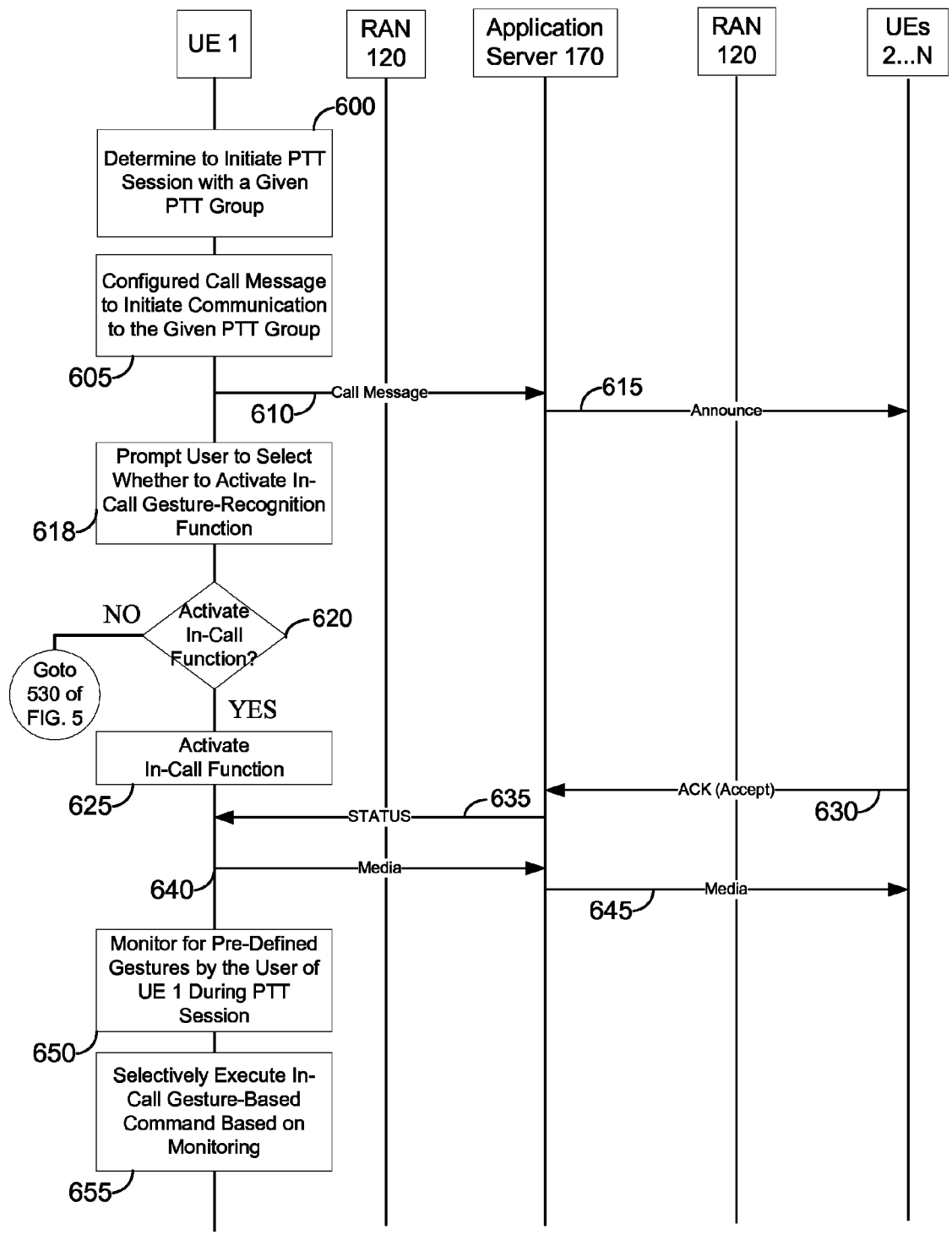
FIG. 6 illustrates a process of activating in-call gesture-recognition for a PTT session in accordance with an embodiment of the invention.
Figure 7A:
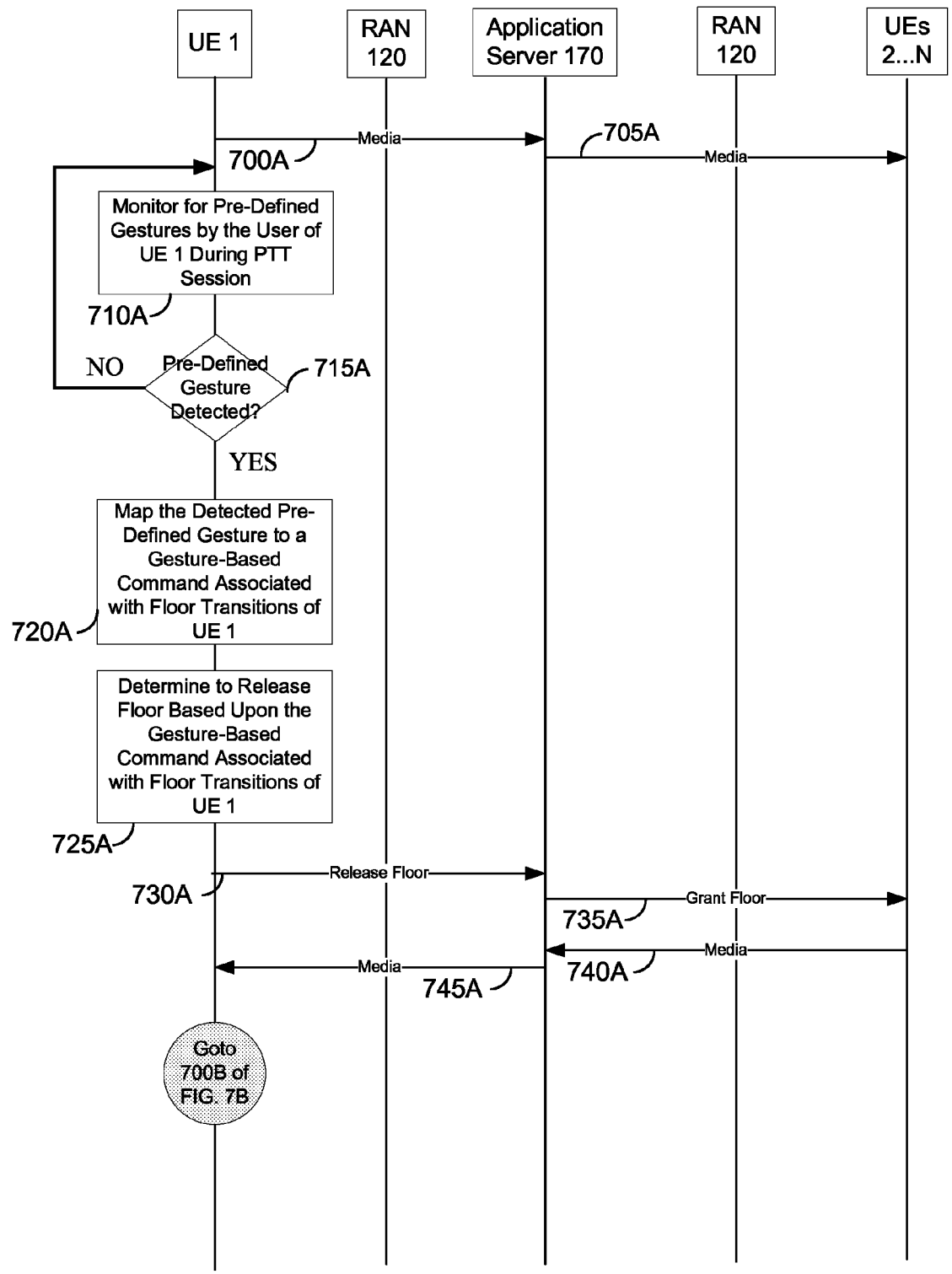
FIGS. 7A-7B illustrate processes by which a user controls floor-transfers via in-call gestures during a PTT session in accordance with embodiments of the invention.
Figure 7B:
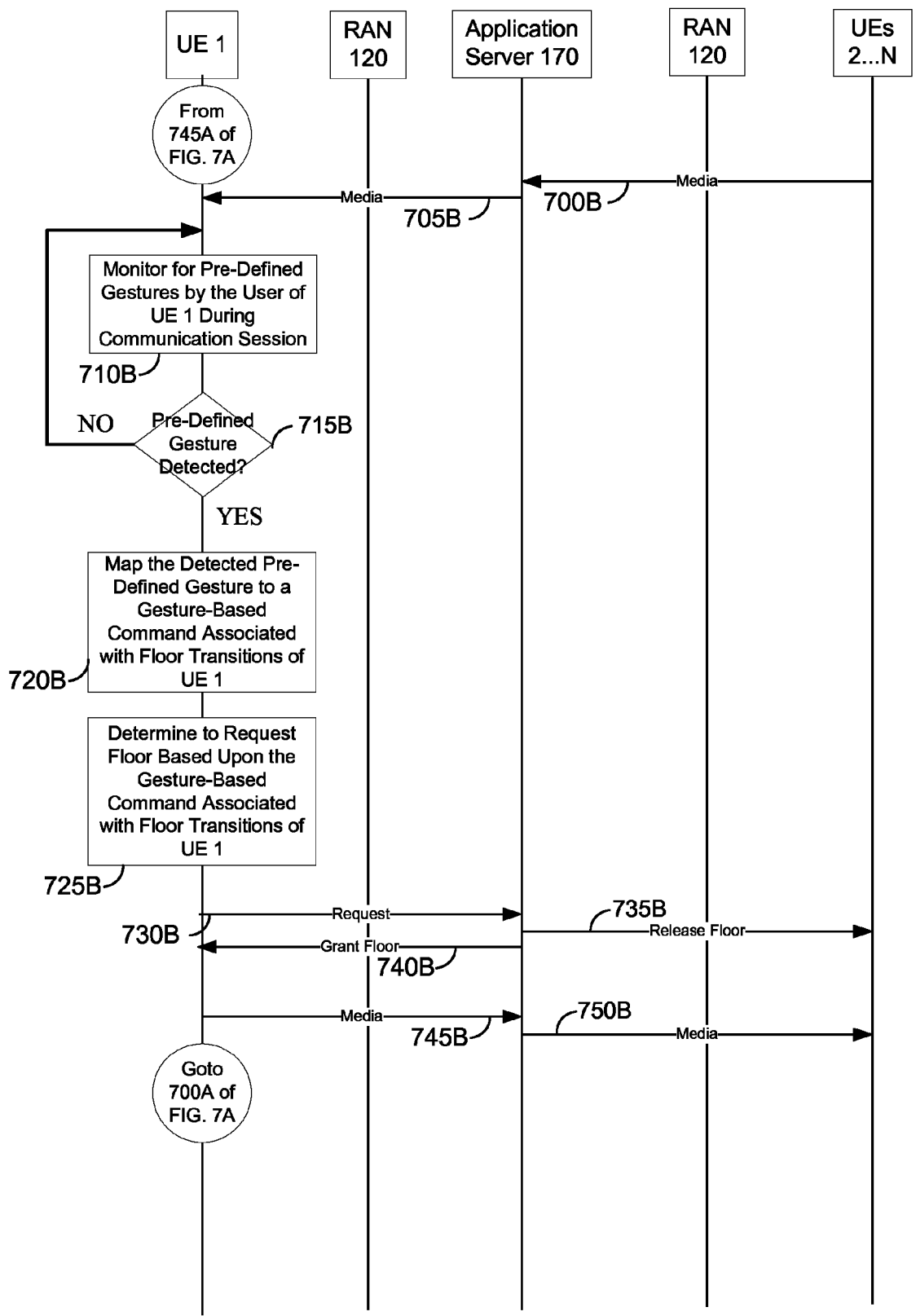

Referring to FIG. 6, assume that UE 1 determines to initiate a PTT session with a given PTT group, 600. In FIG. 6, similar to FIG. 5, UE 1 may be configured as discussed above with respect to UE 200 of FIG. 3, such that UE 1 is provisioned with sensors 1 . . . N 233 which can be used to facilitate a detection of gestures made by the user of UE 1.

With respect to FIG. 6, the determination of 600 may correspond to 500 through 510 of FIG. 5, such that the determination of 600 is the culmination of a detection of a pre-defined gesture made by the user of UE 1, followed by an association or mapping of the detected pre-defined gesture to a particular PTT group. Alternatively, the determination of 600 may correspond to 400 through 410 of FIG. 4, such that the determination of 600 is the culmination of a conventional dedicated or virtual PTT button-push by the user of UE 1.

Referring to FIG. 6, after determining to initiate the PTT session with the given PTT group in 600, UE 1 configures a call message to request initiation of a PTT session with the given PTT group by the application server 170, 605. UE 1 sends the call message to the RAN 120, which then forwards the call message to the application server 170, 610. The application server 170 receives the call message from UE 1, identifies and locates the target UEs 2 . . . N associated with the PTT session to be initiated, and then announces the PTT session to the target UEs 2 . . . N, 615.

Referring to FIG. 6, at some point after the determination of 600 while the PTT session is being set-up by the application server 170, UE 1 presents a prompt to its user for an indication with regard to whether an in-call gesture-recognition function is to be activated at UE 1, 618. For example, the prompt of 618 can correspond to a video, audio, text and/or vibration output by UE 1 to the user, which is configured to notify the user to provide input indicative of whether the user desires to activate the in-call gesture-recognition function. For example, the user input can correspond to pressing a touch-screen or physical button associated with turning-on or turning-off the in-call gesture-recognition function. In another example, the user input can correspond to one of a plurality of pre-defined gestures associated with turning-on or turning-off the in-call gesture-recognition function. In this case, UE 1 may begin monitoring or continue to monitor for gestures as in 500 of FIG. 5 in conjunction with presenting the prompt to the user in 618.

In a further example, the user's opportunity to activate the in-call gesture-recognition function may be limited to a window of time during set-up of the PTT session and/or at the beginning of the PTT session. In this case, UE 1 may start a timer in conjunction with presenting the prompt at 618, and in the case that no user input is received in response to the prompt, UE 1 sets the in-call gesture-recognition function to a default level (e.g., either activated or de-activated). Accordingly, UE 1 can permit its user a relatively brief opportunity to control whether gesture-based commands will be used by the user of UE 1 during the PTT session. As will be appreciated, if the in-call gesture-recognition function is activated in an indiscriminate manner, it is possible a user could inadvertently make gestures that were not actually intended to trigger gesture-based commands.

Based on the user input received in response to the prompt of 618 (or lack thereof), UE 1 determines whether to activate the in-call gesture-recognition function at UE 1 for the PTT session at 620. If UE 1 determines not to activate the in-call gesture-recognition function at UE 1 for the PTT session at 620, the process advances to 530 of FIG. 5 and the PTT session is conducted by the user of UE 1 without gesture-based command support. Otherwise, if UE 1 determines to activate the in-call gesture-recognition function at UE 1 for the PTT session at 620, UE 1 activates the in-call gesture-recognition function in 625 and the PTT session is conducted by the user of UE 1 without gesture-based command support.

Referring to FIG. 6, at some point after the application server 170 announces the PTT session to target UEs 2 . . . N, assume that at least one of target UEs 2 . . . N sends a message back to the application server 170 to acknowledge and accept the announced PTT session, 630. The application server 170 sends an indication to UE 1 that the PTT session is now active or connected and that UE 1 holds the floor, 635. UE 1 begins transmitting media in association with the PTT session in 640, and the application server 170 forwards UE 1's media to the target UEs 2 . . . N, 645.

During the PTT session, UE 1 monitors for gestures made by the user of UE 1, 650, and based on the gesture-monitoring, UE 1 selectively executes in-call gesture-based commands, 655. The monitoring that occurs at 650 may be similar to the monitoring that occurs at 500 of FIG. 5, except that the monitoring at 650 occurs in-call whereas the monitoring at 500 of FIG. 5 occurs during set-up of the PTT session. Examples of the type of gesture-based commands that can be executed during the PTT session, or in-call, at 655 are described below in more detail with respect to FIGS. 7A-7B.

Referring to FIG. 7A, assume that UE 1 is participating in a PTT session with target UEs 2 . . . N, and that UE 1 is the current floor-holder of the PTT session. Accordingly, UE 1 transmits media in association with the PTT session in 700A, and the application server 170 forwards UE 1's media to the target UEs 2 . . . N, 705A. In an example, 700A and 705A can correspond to media exchanged during a PTT session established in accordance with FIG. 5 and/or FIG. 6.

While UE 1 is participating in the PTT session, similar to 500 of FIG. 5, assume that UE 1 is operating in a state whereby one or more of sensors 1 . . . N 233 are activated and are being used to monitor for pre-defined gestures made by the user of UE 1, 710A. As noted above, the pre-defined gestures that are being monitored in 710A may include (a) the user flicking his/her wrist while holding UE 1, (b) the user walking or jogging with the UE 1, (c) the user picking up UE 1 from a surface or storage location, (d) the user placing UE 1 onto a surface or into a storage location, (e) the user shaking UE 1, and/or (f) a proximity of the user's fingers being close to a display of UE 1. While the examples of pre-defined gestures for monitoring provided with respect to 500 of FIG. 5 are the same as the pre-defined gestures monitored at 710A, it will be appreciated that the pre-defined gestures monitored for PTT session initiation at 500 of FIG. 5 need not be the same as the in-call pre-defined gestures monitored at 710A. In other words, different types of gestures can be used to initiate PTT sessions as compared to gestures that are used to control in-call functions (e.g., floor control, etc.).

Also, similar to 500 of FIG. 5, the pre-defined gestures that UE 1 is configured to detect at 710A can be either user-defined gestures or preset gestures that are pre-loaded in association with a multimedia application or client configured to manage UE 1's PTT sessions. In the case of user-defined gestures, the user of UE 1 can either select a subset of available preset gestures (more specifically, sensor data profiles corresponding to the gestures) through the multimedia client and select commands to be associated with each gesture in the subset. Alternatively, prior to setting up the PTT session, the user of UE 1 can engage a learning mode or training mode whereby the user of UE 1 performs a custom gesture while one or more of sensors 1 . . . N 233 are activated. The multimedia client can then generate a sensor data profile of the custom gesture to be associated with a particular gesture-based command (e.g., request floor, release floor, change floor status, terminate call, etc.), and can thereafter compare current sensor measurement data against the sensor data profile to determine when the user makes the custom gesture. Similarly, with respect to the preset or default gestures that are built into the multimedia client, each preset or default gesture can be associated with a particular sensor data profile to be compared against current sensor measurement data to determine when the user makes the preset or default gesture.

Based on the monitoring via the sensors 1 . . . N 233 of 710A, UE 1 determines whether the sensors 1 . . . N 233 have detected that the user of UE 1 has made one of the plurality of pre-defined gestures, 715A. If UE 1 determines that the user of UE 1 has not made one of the plurality of pre-defined gestures in 715A, the process returns to 710A and UE 1 continues to monitor for a detection of one of the plurality of pre-defined gestures while UE 1 continues its participation in the PTT session as floor-holder. Otherwise, if UE 1 determines that the user of UE 1 has made one of the plurality of pre-defined gestures in 715A, UE 1 maps the detected pre-defined gesture to a gesture-based command associated with floor-transitions of UE 1, 720A.

In 725A of FIG. 7A, UE 1 determines to release the floor of the PTT session based upon the gesture-based command associated with floor-transitions of UE 1 at 720A. In an example, the determination of 725A can be based upon the gesture-based command corresponding to an explicit indication for UE 1 to achieve a state whereby UE 1 is not the floor-holder of the PTT session. In another example, the determination of 725A can be based upon the gesture-based command corresponding to an indication for UE 1 to change its current floor-status, such that the determination by UE 1 to release the floor at 725A is based both upon the floor-status transition command in conjunction with UE 1's current status as floor-holder.

After determining to release the floor in 725A, UE 1 sends a message to the RAN 120 indicating UE 1's floor-release request, and the RAN 120 forwards UE 1's floor-release message to the application server 170, 730A. The application server 170 then grants the floor to one of target UEs 2 . . . N, 735A. While not shown explicitly in FIG. 7A, the floor-grant of 735A can be based upon a floor-request message from the new floor-holder that is received at the application server 170 before or after the floor-release message of 730A. The new floor-holder UE among target UEs 2 . . . N then begins transmitting media in association with the PTT session in 740A, and the application server 170 forwards the new floor-holder UE's media to the UE 1, 745A. While not shown explicitly in FIG. 7A, if N>2, the application server 170 may also forward the media from UE 2 to at least one of target UEs 2 . . . N other than the new floor-holder UE.

FIG. 7B illustrates a continuation of the process of FIG. 7A in accordance with an embodiment of the invention. In particular, UE 1 is participating in a PTT session with target UEs 2 . . . N, and it may be assumed that the UE 2 is the current floor-holder of the PTT session. Accordingly, UE 2 continues to transmit media in association with the PTT session in 700B, and the application server 170 forwards UE 2's media to UE 1, 705B. While not shown explicitly in FIG. 7B, if N>2, the application server 170 may also forward the media from UE 2 to target UEs 3 . . . N.

While UE 1 is participating in the PTT session, similar to 500 of FIG. 5, assume that UE 1 is operating in a state whereby one or more of sensors 1 . . . N 233 are activated and are being used to monitor for gestures by the user of UE 1, 710B. 710B is similar to 710A of FIG. 7A, and as such will not be described further for the sake of brevity.

Based on the monitoring via the sensors 1 . . . N 233 of 710B, UE 1 determines whether the sensors 1 . . . N 233 have detected that the user of UE 1 has made one of the plurality of pre-defined gestures, 715B. If UE 1 determines that the user of UE 1 has not made one of the plurality of pre-defined gestures in 715B, the process returns to 710B and UE 1 continues to monitor for a detection of one of the plurality of pre-defined gestures while UE 1 continues its participation in the PTT session by monitoring the PTT traffic from UE 2. Otherwise, if UE 1 determines that the user of UE 1 has made one of the plurality of pre-defined gestures in 715B, UE 1 maps the detected pre-defined gesture to a gesture-based command associated with floor-transitions of UE 1, 720B.

In 725B of FIG. 7B, UE 1 determines to request the floor of the PTT session based upon the gesture-based command associated with floor-transitions of UE 1 at 720B. In an example, the determination of 725B can be based upon the gesture-based command corresponding to an explicit indication for UE 1 to achieve a state whereby UE 1 is the floor-holder of the PTT session. In another example, the determination of 725B can be based upon the gesture-based command corresponding to an indication for UE 1 to change its current floor-status, such that the determination by UE 1 to request the floor at 725B is based both upon the floor-status transition command in conjunction with UE 1's current status as a non-floor-holder. In other words, the pre-defined gesture detected at 715B can be the same as the pre-defined gesture detected at 715A of FIG. 7A except for the detection in FIG. 7B occurring while UE 1 is not the floor-holder.

After determining to request the floor in 725B, UE 1 sends a floor request message to the RAN 120, and the RAN 120 forwards UE 1's floor-request to the application server 170, 730B. The application server 170 then notifies UE 2 that its floor has been released or revoked, 735B, and the application server 170 grants the floor to UE 1, 740B. UE 1 then begins transmitting media in association with the PTT session in 745B, and the application server 170 forwards UE 1's media to target UEs 2 . . . N, 750B. At this point, the process can return to 700A of FIG. 7A with UE 1 as floor-holder for the PTT session.

While not shown explicitly in FIGS. 7A and 7B, in-call gesture-based commands need not be limited to invoking a floor-transition. In another embodiment, in-call gesture-based commands can include modifications to volume or other UE-specific call parameters, a command to terminate a particular UE's participation in the PTT session, and so on.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, a half-duplex session, a full-duplex session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium is coupled to the processor such that the processor can read information from, and write information to, the non-transitory storage medium. In the alternative, the non-transitory storage medium may be integral to the processor. The processor and the non-transitory storage medium may reside in an ASIC. The ASIC may reside in a user terminal (e.g., access terminal). In the alternative, the processor and the non-transitory storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE), comprising:
    monitoring for gestures by a user of the UE;
    detecting that a user of the UE has made a first pre-defined gesture;
    determining that the detected first pre-defined gesture is associated with setting up a given group communication session with a given communication group;
    transmitting a call request message to an application server to request set-up of the given group communication session with the given communication group;
    monitoring for gestures by the user of the UE during the given group communication session; and
    detecting that the user of the UE has made a second pre-defined gesture that is associated with a gesture-based command to be executed in association with the given group communication session.

2. The method of claim 1, wherein detecting that a user of the UE has made a first pre-defined gesture includes:
    comparing sensor data measured by one or more sensors coupled to the UE with sensor data profiles associated with a plurality of pre-defined gestures; and
    determining, based on the comparison, that the measured sensor data matches one of the plurality of pre-defined gestures,
    wherein the matching pre-defined gesture corresponds to the detected first pre-defined gesture.

3. The method of claim 2, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

4. The method of claim 2, wherein the sensor data profile for one or more of the plurality of pre-defined gestures are defined by the user during a learning mode of the UE prior to the given group communication session.

5. The method of claim 2, wherein the sensor data profile for one or more of the plurality of pre-defined gestures are preset in association with a multimedia client configured to manage the given group communication session at the UE.

6. The method of claim 2, wherein the plurality of pre-defined gestures includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

7. The method of claim 1, wherein the detected first pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

8. The method of claim 1, wherein the given group communication session corresponds to one of a push-to-talk (PTT) session, a push-to-transfer (PTX) session, a half-duplex session, a full-duplex session and a Voice-over Internet Protocol (VoIP) session.

9. A method of operating a user equipment (UE), comprising:
    receiving a first user input requesting the UE to attempt set-up of a given group communication session to a given communication group;
    transmitting, responsive to the first user input, a call request message to an application server to request set-up of the given group communication session with the given communication group;
    receiving a second user input requesting the UE to monitor for gestures by a user of the UE during the given group communication session; and
    monitoring, during the given group communication session and responsive to the second user input, one or more sensors of the UE in order to detect whether the user of the UE has made a given pre-defined gesture that is mapped to a gesture-based command to be executed in association with the given group communication session.

10. The method of claim 9, wherein the first user input corresponds to the user of the UE pressing a dedicated or virtual push-to-talk (PTT) button on the UE.

11. The method of claim 9, wherein the first user input corresponds to the user making one of a plurality of pre-defined gestures that is detected by the UE.

12. The method of claim 9, wherein receiving the second user input includes:
prompting the user to provide an indication with regard to whether the UE should activate an in-call gesture-recognition function,
wherein the second user input is received in response to the prompt.

13. The method of claim 12, wherein receiving the second user input further includes:
establishing a window of time, after the prompt, within which the user is authorized to activate the in-call gesture-recognition function.

14. The method of claim 13, wherein the in-call gesture-recognition function is not activated if the user fails to provide the second user input within the window of time.

15. The method of claim 9, wherein the monitoring includes:
comparing sensor data measured by one or more sensors coupled to the UE with sensor data profiles associated with a plurality of pre-defined gestures; and
determining, based on the comparison, whether the user of the UE has made the given pre-defined gesture.

16. The method of claim 15, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

17. The method of claim 15, wherein the sensor data profile for one or more of the plurality of pre-defined gestures are defined by the user during a learning mode of the UE prior to the given group communication session.

18. The method of claim 15, wherein the sensor data profile for one or more of the plurality of pre-defined gestures are preset in association with a multimedia client configured to manage the given group communication session at the UE.

19. The method of claim 9, wherein the given pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

20. The method of claim 9, wherein the given group communication session corresponds to one of a push-to-talk (PTT) session, a push-to-transfer (PTX) session, a half-duplex session, a full-duplex session and a Voice-over Internet Protocol (VoIP) session.

21. A method of participating in a given group communication session at a user equipment (UE), comprising:
detecting that a user of the UE has made a first pre-defined gesture;
determining that the detected first pre-defined gesture is associated with setting up the given group communication session with a given communication group;
transmitting a call request message to an application server to request set-up of the given group communication session with the given communication group;
exchanging media between the UE and at least one other UE participating in the given group communication session;
monitoring, during the given group communication session, one or more sensors of the UE in order to detect whether the user of the UE has made at least one second pre-defined gesture that is mapped to a gesture-based command to be executed in association with the given group communication session;
detecting, based on the monitoring, that the user of the UE has made the second pre-defined gesture, wherein the second pre-defined gesture is mapped to a given gesture-based command associated with transitioning a floor-holder status of the UE; and
executing the given gesture-based command by transmitting, to the application server that is arbitrating the given group communication session between the UE and the at least one other UE, a request to facilitate a transition of the floor-holder status of the UE.

22. The method of claim 21,
wherein the UE is a current floor-holder of the given group communication session prior to the detection of the second pre-defined gesture,
wherein the given gesture-based command is associated with the UE releasing the floor of the given group communication session, and
wherein the transmitted request corresponds to a floor-release message.

23. The method of claim 22, wherein the given gesture-based command is to change a current floor status of the UE, such that the given gesture-based command being associated with the UE releasing the floor of the given group communication session is based upon the UE's current floor status being the current floor-holder of the given group communication session.

24. The method of claim 22, wherein the given gesture-based command is to achieve a state whereby the UE is not the floor-holder of the given group communication session.

25. The method of claim 21,
wherein the UE is not a current floor-holder of the given group communication session prior to the detection of the second pre-defined gesture,
wherein the given gesture-based command is associated with the UE requesting the floor of the given group communication session, and
wherein the transmitted request corresponds to a floor-request message.

26. The method of claim 25, wherein the given gesture-based command is to change a current floor status of the UE, such that the given gesture-based command being associated with the UE requesting the floor of the given group communication session is based upon the UE's current floor status being a non-floor-holder of the given group communication session.

27. The method of claim 25, wherein the given gesture-based command is to achieve a state whereby the UE is the floor-holder of the given group communication session.

28. The method of claim 21, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

29. The method of claim 21, wherein detecting that the user has made the second pre-defined gesture includes:

comparing sensor data measured by the one or more sensors with sensor data profiles associated with the at least one second pre-defined gesture; and determining, based on the comparison, that the measured sensor data matches the second pre-defined gesture from among the at least one pre-defined gestures.

30. The method of claim 29, wherein the sensor data profile for the at least one second pre-defined gesture is defined by the user during a learning mode of the UE prior to the given group communication session.

31. The method of claim 29, wherein the sensor data profile for the at least one second pre-defined gesture is preset in association with a multimedia client configured to manage the given group communication session at the UE.

32. The method of claim 29, wherein the at least one second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

33. The method of claim 21, wherein the second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

34. The method of claim 21, wherein the given group communication session corresponds to one of a push-to-talk (PTT) session, a push-to-transfer (PTX) session, a half-duplex session, a full-duplex session and a Voice-over Internet Protocol (VoIP) session.

35. A user equipment (UE), comprising:
means for detecting that a user of the UE has made a first pre-defined gesture;
means for determining that the detected first pre-defined gesture is associated with setting up a given group communication session with a given communication group;
means for transmitting a call request message to an application server to request set-up of the given group communication session with the given communication group;
means for monitoring for gestures by the user of the UE during the given group communication session; and
means for detecting that the user of the UE has made a second pre-defined gesture that is associated with a gesture-based command to be executed in association with the given group communication session.

36. A user equipment (UE), comprising:
means for receiving a first user input requesting the UE to attempt set-up of a given group communication session to a given communication group;
means for transmitting, responsive to the first user input, a call request message to an application server to request set-up of the given group communication session with the given communication group;
means for receiving a second user input requesting the UE to monitor for gestures by a user of the UE during the given group communication session; and
means for monitoring, during the given group communication session and responsive to the second user input, one or more sensors of the UE in order to detect whether the user of the UE has made a given pre-defined gesture that is mapped to a gesture-based command to be executed in association with the given group communication session.

37. A user equipment (UE), comprising:
means for monitoring gestures made by a user of the UE;
means for detecting that a user of the UE has made a first pre-defined gesture;
means for determining that the detected first pre-defined gesture is associated with setting up the given group communication session with a given communication group;
means for transmitting a call request message to an application server to request set-up of the given group communication session with the given communication group;
means for exchanging media between the UE and at least one other UE participating in the given group communication session;
means for monitoring, during the given group communication session, one or more sensors of the UE in order to detect whether the user of the UE has made at least one second pre-defined gesture that is mapped to a gesture-based command to be executed in association with the given group communication session;
wherein the second pre-defined gesture is mapped to a given gesture-based command associated with transitioning a floor-holder status of the UE; and
means for executing the given gesture-based command by transmitting, to an application server that is arbitrating the given group communication session between the UE and the at least one other UE, a request to facilitate a transition of the floor-holder status of the UE.

38. A user equipment (UE), comprising:
a processor configured with processor-executable instructions configured to cause the processor to perform operations comprising:
monitoring for gestures by the user of the UE;
detecting that a user of the UE has made a first pre-defined gesture;
determining that the detected first pre-defined gesture is associated with setting up a given group communication session with a given communication group;
transmitting a call request message to an application server to request set-up of the given group communication session with the given communication group;
monitoring for gestures by the user of the UE during the given group communication session; and
detecting that the user of the UE has made a second pre-defined gesture that is associated with a gesture-based command to be executed in association with the given group communication session.

39. A user equipment (UE), comprising:
a processor configured with processor-executable instructions configured to cause the processor to perform operations comprising:
receiving a first user input requesting the UE to attempt set-up of a given group communication session to a given communication group;
transmitting, responsive to the first user input, a call request message to an application server to request set-up of the given group communication session with the given communication group;
receiving a second user input requesting the UE to monitor for gestures by a user of the UE during the given group communication session; and
monitoring, during the given group communication session and responsive to the second user input, one or more sensors of the UE in order to detect whether the user of the UE has made a given pre-defined gesture that is mapped to a gesture-based command to be executed in association with the given group communication session.

40. A user equipment (UE), comprising:
a processor configured with processor-executable instructions configured to cause the processor to perform operations comprising:
   detecting that a user of the UE has made a first pre-defined gesture;
   determining that the detected first pre-defined gesture is associated with setting up the given group communication session with a given communication group;
   transmitting a call request message to an application server to request set-up of the given group communication session with the given communication group;
   exchanging media between the UE and at least one other UE participating in the given group communication session;
   monitoring, during the given group communication session, one or more sensors of the UE in order to detect whether the user of the UE has made at least one second pre-defined gesture that is mapped to a gesture-based command to be executed in association with the given group communication session;
   detecting, based on the monitoring, that the user of the UE has made the second pre-defined gesture, wherein the second pre-defined gesture is mapped to a given gesture-based command associated with transitioning a floor-holder status of the UE; and
   executing the given gesture-based command by transmitting, to an application server that is arbitrating the given group communication session between the UE and the at least one other UE, a request to facilitate a transition of the floor-holder status of the UE.

41. A non-transitory computer-readable storage medium having stored thereon processor-executable instructions configured to cause a processor of a user equipment (UE) to perform operations comprising:
   detecting that a user of the UE has made a first pre-defined gesture;
   determining that the detected first pre-defined gesture is associated with setting up a given group communication session with a given communication group;
   transmitting a call request message to an application server to request set-up of the given group communication session with the given communication group;
   monitoring for gestures by the user of the UE during the given group communication session; and
   detecting that the user of the UE has made a second pre-defined gesture that is associated with a gesture-based command to be executed in association with the given group communication session.

42. A non-transitory computer-readable storage medium having stored thereon processor-executable instructions configured to cause a processor of a user equipment (UE) to perform operations comprising:
   receiving a first user input requesting the UE to attempt set-up of a given group communication session to a given communication group;
   transmitting, responsive to the first user input, a call request message to an application server to request set-up of the given group communication session with the given communication group;
   receiving a second user input requesting the UE to monitor for gestures by a user of the UE during the given group communication session; and
   monitoring, during the given group communication session and responsive to the second user input, one or more sensors of the UE in order to detect whether the user of the UE has made a given pre-defined gesture that is mapped to a gesture-based command to be executed in association with the given group communication session.

43. A non-transitory computer-readable storage medium having stored thereon processor-executable instructions configured to cause a processor of a user equipment (UE) to perform operations comprising:
   detecting that a user of the UE has made a first pre-defined gesture;
   determining that the detected first pre-defined gesture is associated with setting up the given group communication session with a given communication group;
   transmitting a call request message to an application server to request set-up of the given group communication session with the given communication group;
   exchanging media between the UE and at least one other UE participating in the given group communication session;
   monitoring, during the given group communication session, one or more sensors of the UE in order to detect whether the user of the UE has made at least one second pre-defined gesture that is mapped to a gesture-based command to be executed in association with the given group communication session;
   detecting, based on the monitoring, that the user of the UE has made the second pre-defined gesture, wherein the second pre-defined gesture is mapped to a given gesture-based command associated with transitioning a floor-holder status of the UE; and
   executing the given gesture-based command by transmitting, to an application server that is arbitrating the given group communication session between the UE and the at least one other UE, a request to facilitate a transition of the floor-holder status of the UE.

44. The UE of claim 37, wherein means for detecting that a user of the UE has made a first pre-defined gesture includes:
   means for comparing sensor data measured by one or more sensors coupled to the UE with sensor data profiles associated with a plurality of pre-defined gestures; and
   means for determining, based on the comparison, that the measured sensor data matches the detected first pre-defined gesture.

45. The UE of claim 44, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

46. The UE of claim 44, wherein the sensor data profile for one or more of the plurality of pre-defined gestures are defined by the user during a learning mode of the UE prior to the given group communication session.

47. The UE of claim 44, wherein the sensor data profile for one or more of the plurality of pre-defined gestures are preset in association with a multimedia client configured to manage the given group communication session at the UE.

48. The UE of claim 44, wherein the plurality of pre-defined gestures includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

49. The UE of claim 37, wherein the detected first pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

50. The UE of claim 37, wherein the given group communication session corresponds to one of a push-to-talk (PTT) session, a push-to-transfer (PTX) session, a half-duplex session, a full-duplex session and a Voice-over Internet Protocol (VoIP) session.

51. The UE of claim 38, wherein the processor is configured with processor-executable instructions configured to cause the processor to perform operations such that detecting that a user of the UE has made a first pre-defined gesture further comprises:
 comparing sensor data measured by one or more sensors coupled to the UE with sensor data profiles associated with a plurality of pre-defined gestures; and
 determining, based on the comparison, that the measured sensor data matches one of the plurality of pre-defined gestures,
 wherein the matching pre-defined gesture corresponds to the detected first pre-defined gesture.

52. The UE of claim 51, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

53. The UE of claim 51, wherein the sensor data profile for one or more of the plurality of pre-defined gestures are defined by the user during a learning mode of the UE prior to the given group communication session.

54. The UE of claim 51, wherein the sensor data profile for one or more of the plurality of pre-defined gestures are preset in association with a multimedia client configured to manage the given group communication session at the UE.

55. The UE of claim 51, wherein the plurality of pre-defined gestures includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

56. The UE of claim 38, wherein the detected first pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

57. The UE of claim 38, wherein the given group communication session corresponds to one of a push-to-talk (PTT) session, a push-to-transfer (PTX) session, a half-duplex session, a full-duplex session and a Voice-over Internet Protocol (VoIP) session.

58. The non-transitory computer-readable storage medium of claim 41, wherein the processor-executable instructions are configured to cause the processor of a user equipment (UE) to perform operations such that the detecting that a user of the UE has made a first pre-defined gesture further comprises:
 comparing sensor data measured by one or more sensors coupled to the UE with sensor data profiles associated with a plurality of pre-defined gestures; and
 determining, based on the comparison, that the measured sensor data matches one of the plurality of pre-defined gestures,
 wherein the matching pre-defined gesture corresponds to the detected first pre-defined gesture.

59. The non-transitory computer-readable storage medium of claim 58, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

60. The non-transitory computer-readable storage medium of claim 58, wherein the sensor data profile for one or more of the plurality of pre-defined gestures are defined by the user during a learning mode of the UE prior to the given group communication session.

61. The non-transitory computer-readable storage medium of claim 58, wherein the sensor data profile for one or more of the plurality of pre-defined gestures are preset in association with a multimedia client configured to manage the given group communication session at the UE.

62. The non-transitory computer-readable storage medium of claim 58, wherein the plurality of pre-defined gestures includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

63. The non-transitory computer-readable storage medium of claim 41, wherein the detected first pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

64. The non-transitory computer-readable storage medium of claim 41, wherein the given group communication session corresponds to one of a push-to-talk (PTT) session, a push-to-transfer (PTX) session, a half-duplex session, a full-duplex session and a Voice-over Internet Protocol (VoIP) session.

65. The UE of claim 36, wherein the first user input corresponds to the user of the UE pressing a dedicated or virtual push-to-talk (PTT) button on the UE.

66. The UE of claim 36, wherein the first user input corresponds to the user making one of a plurality of pre-defined gestures that is detected by the UE.

67. The UE of claim 36, wherein means for receiving the second user input further comprises:
 means for prompting the user to provide an indication with regard to whether the UE should activate an in-call gesture-recognition function,
 wherein the second user input is received in response to the prompt.

68. The UE of claim 67, wherein means for receiving the second user input further comprises:
 means for establishing a window of time, after the prompt, within which the user is authorized to activate the in-call gesture-recognition function.

69. The UE of claim 68, wherein the in-call gesture-recognition function is not activated if the user fails to provide the second user input within the window of time.

70. The UE of claim 36, wherein means for monitoring further comprises:
means for comparing sensor data measured by one or more sensors coupled to the UE with sensor data profiles associated with a plurality of pre-defined gestures; and
means for determining, based on the comparison, whether the user of the UE has made the given pre-defined gesture.

71. The UE of claim 70, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

72. The UE of claim 70, wherein the sensor data profile for one or more of the plurality of pre-defined gestures are defined by the user during a learning mode of the UE prior to the given group communication session.

73. The UE of claim 70, wherein the sensor data profile for one or more of the plurality of pre-defined gestures are preset in a association with a multimedia client configured to manage the given group communication session at the UE.

74. The UE of claim 36, wherein the given pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

75. The UE of claim 36, wherein the given group communication session corresponds to one of a push-to-talk (PTT) session, a push-to-transfer (PTX) session, a half-duplex session, a full-duplex session and a Voice-over Internet Protocol (VoIP) session.

76. The UE of claim 39, wherein the first user input corresponds to the user of the UE pressing a dedicated or virtual push-to-talk (PTT) button on the UE.

77. The UE of claim 39, wherein the first user input corresponds to the user making one of a plurality of pre-defined gestures that is detected by the UE.

78. The UE of claim 39, wherein the processor is configured with processor-executable instructions configured to cause the processor to perform operations such that receiving the second user input further comprises:
prompting the user to provide an indication with regard to whether the UE should activate an in-call gesture-recognition function,
wherein the second user input is received in response to the prompt.

79. The UE of claim 78, wherein the processor is configured with processor-executable instructions configured to cause the processor to perform operations such that receiving the second user input further comprises:
establishing a window of time, after the prompt, within which the user is authorized to activate the in-call gesture-recognition function.

80. The UE of claim 79, wherein the in-call gesture-recognition function is not activated if the user fails to provide the second user input within the window of time.

81. The UE of claim 39, wherein the processor is configured with processor-executable instructions configured to cause the processor to perform operations such that the monitoring includes:
comparing sensor data measured by one or more sensors coupled to the UE with sensor data profiles associated with a plurality of pre-defined gestures; and
determining, based on the comparison, whether the user of the UE has made the given pre-defined gesture.

82. The UE of claim 81, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

83. The UE of claim 81, wherein the sensor data profile for one or more of the plurality of pre-defined gestures are defined by the user during a learning mode of the UE prior to the given group communication session.

84. The UE of claim 81, wherein the sensor data profile for one or more of the plurality of pre-defined gestures are preset in a association with a multimedia client configured to manage the given group communication session at the UE.

85. The UE of claim 39, wherein the given pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

86. The UE of claim 39, wherein the given group communication session corresponds to one of a push-to-talk (PTT) session, a push-to-transfer (PTX) session, a half-duplex session, a full-duplex session and a Voice-over Internet Protocol (VoIP) session.

87. The non-transitory computer-readable storage medium of claim 42, wherein the first user input corresponds to the user of the UE pressing a dedicated or virtual push-to-talk (PTT) button on the UE.

88. The non-transitory computer-readable storage medium of claim 42, wherein the first user input corresponds to the user making one of a plurality of pre-defined gestures that is detected by the UE.

89. The non-transitory computer-readable storage medium of claim 42, wherein the processor-executable instructions are configured to cause the processor of a user equipment (UE) to perform operations such that receiving the second user input further comprises:
prompting the user to provide an indication with regard to whether the UE should activate an in-call gesture-recognition function,
wherein the second user input is received in response to the prompt.

90. The non-transitory computer-readable storage medium of claim 89, wherein the processor-executable instructions are configured to cause the processor of a user equipment (UE) to perform operations such that receiving the second user input further comprises:
establishing a window of time, after the prompt, within which the user is authorized to activate the in-call gesture-recognition function.

91. The non-transitory computer readable medium of claim 90, wherein the in-call gesture-recognition function is not activated if the user fails to provide the second user input within the window of time.

92. The non-transitory computer readable medium of claim 42, wherein the processor- executable instructions are configured to cause the processor of a user equipment (UE) to perform operations such that the monitoring includes:

comparing sensor data measured by one or more sensors coupled to the UE with sensor data profiles associated with a plurality of pre-defined gestures; and determining, based on the comparison, whether the user of the UE has made the given pre-defined gesture.

93. The non-transitory computer readable medium of claim 92, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

94. The non-transitory computer readable medium of claim 92, wherein the sensor data profile for one or more of the plurality of pre-defined gestures are defined by the user during a learning mode of the UE prior to the given group communication session.

95. The non-transitory computer readable medium of claim 92, wherein the sensor data profile for one or more of the plurality of pre-defined gestures are preset in a association with a multimedia client configured to manage the given group communication session at the UE.

96. The non-transitory computer readable medium of claim 42, wherein the given pre- defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

97. The non-transitory computer readable medium of claim 42, wherein the given group communication session corresponds to one of a push-to-talk (PTT) session, a push-to-transfer (PTX) session, a half-duplex session, a full-duplex session and a Voice-over Internet Protocol (VoIP) session.

98. The UE of claim 35,
wherein the UE is a current floor-holder of the given group communication session prior to the detection of the second pre-defined gesture,
wherein the given gesture-based command is associated with the UE releasing the floor of the given group communication session, and
wherein the transmitted request corresponds to a floor-release message.

99. The UE of claim 98, wherein the given gesture-based command is to change a current floor status of the UE, such that the given gesture-based command being associated with the UE releasing the floor of the given group communication session is based upon the UE's current floor status being the current floor-holder of the given group communication session.

100. The UE of claim 98, wherein the given gesture-based command is to achieve a state whereby the UE is not the floor-holder of the given group communication session.

101. The UE of claim 35,
wherein the UE is not a current floor-holder of the given group communication session prior to the detection of the second pre-defined gesture,
wherein the given gesture-based command is associated with the UE requesting the floor of the given group communication session, and
wherein the transmitted request corresponds to a floor-request message.

102. The UE of claim 101, wherein the given gesture-based command is to change a current floor status of the UE, such that the given gesture-based command being associated with the UE requesting the floor of the given group communication session is based upon the UE's current floor status being a non-floor-holder of the given group communication session.

103. The UE of claim 101, wherein the given gesture-based command is to achieve a state whereby the UE is the floor-holder of the given group communication session.

104. The UE of claim 35, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

105. The UE of claim 35, wherein means for detecting that the user has made the second pre-defined gesture further comprises:
means for comparing sensor data measured by the one or more sensors with sensor data profiles associated with the at least one second pre-defined gesture; and
means for determining, based on the comparison, that the measured sensor data matches the second pre-defined gesture from among the at least one pre-defined gestures.

106. The UE of claim 105, wherein the sensor data profile for the at least one second pre-defined gesture is defined by the user during a learning mode of the UE prior to the given group communication session.

107. The UE of claim 105, wherein the sensor data profile for the at least one second pre-defined gesture is preset in association with a multimedia client configured to manage the given group communication session at the UE.

108. The UE of claim 105, wherein the at least one second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

109. The UE of claim 35, wherein the second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

110. The UE of claim 35, wherein the given group communication session corresponds to one of a push-to-talk (PTT) session, a push-to-transfer (PTX) session, a half-duplex session, a full-duplex session and a Voice-over Internet Protocol (VoIP) session.

111. The UE of claim 40,
wherein the UE is a current floor-holder of the given group communication session prior to the detection of the second pre-defined gesture,
wherein the given gesture-based command is associated with the UE releasing the floor of the given group communication session, and
wherein the transmitted request corresponds to a floor-release message.

112. The UE of claim 111, wherein the given gesture-based command is to change a current floor status of the UE, such that the given gesture-based command being associated with the UE releasing the floor of the given group communication session is based upon the UE's current floor status being the current floor-holder of the given group communication session.

113. The UE of claim 111, wherein the given gesture-based command is to achieve a state whereby the UE is not the floor-holder of the given group communication session.

114. The UE of claim 40,
wherein the UE is not a current floor-holder of the given group communication session prior to the detection of the second pre-defined gesture,
wherein the given gesture-based command is associated with the UE requesting the floor of the given group communication session, and
wherein the transmitted request corresponds to a floor-request message.

115. The UE of claim 114, wherein the given gesture-based command is to change a current floor status of the UE, such that the given gesture-based command being associated with the UE requesting the floor of the given group communication session is based upon the UE's current floor status being a non-floor-holder of the given group communication session.

116. The UE of claim 114, wherein the given gesture-based command is to achieve a state whereby the UE is the floor-holder of the given group communication session.

117. The UE of claim 40, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

118. The UE of claim 40, wherein the processor is configured with processor-executable instructions configured to cause the processor to perform operations such that detecting that the user has made the second pre-defined gesture further comprises:
comparing sensor data measured by the one or more sensors with sensor data profiles associated with the at least one second pre-defined gesture; and
determining, based on the comparison, that the measured sensor data matches the second pre-defined gesture from among the at least one pre-defined gestures.

119. The UE of claim 118, wherein the sensor data profile for the at least one second pre-defined gesture is defined by the user during a learning mode of the UE prior to the given group communication session.

120. The UE of claim 118, wherein the sensor data profile for the at least one second pre-defined gesture is preset in association with a multimedia client configured to manage the given group communication session at the UE.

121. The UE of claim 118, wherein the at least one second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

122. The UE of claim 40, wherein the second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

123. The UE of claim 40, wherein the given group communication session corresponds to one of a push-to-talk (PTT) session, a push-to-transfer (PTX) session, a half-duplex session, a full-duplex session and a Voice-over Internet Protocol (VoIP) session.

124. The non-transitory computer-readable storage medium of claim 43,
wherein the UE is a current floor-holder of the given group communication session prior to the detection of the second pre-defined gesture,
wherein the given gesture-based command is associated with the UE releasing the floor of the given group communication session, and
wherein the transmitted request corresponds to a floor-release message.

125. The non-transitory computer-readable storage medium of claim 124, wherein the given gesture-based command is to change a current floor status of the UE, such that the given gesture-based command being associated with the UE releasing the floor of the given group communication session is based upon the UE's current floor status being the current floor-holder of the given group communication session.

126. The non-transitory computer-readable storage medium of claim 124, wherein the given gesture-based command is to achieve a state whereby the UE is not the floor-holder of the given group communication session.

127. The non-transitory computer-readable storage medium of claim 43,
wherein the UE is not a current floor-holder of the given group communication session prior to the detection of the second pre-defined gesture,
wherein the given gesture-based command is associated with the UE requesting the floor of the given group communication session, and
wherein the transmitted request corresponds to a floor-request message.

128. The non-transitory computer-readable storage medium of claim 127, wherein the given gesture-based command is to change a current floor status of the UE, such that the given gesture-based command being associated with the UE requesting the floor of the given group communication session is based upon the UE's current floor status being a non-floor-holder of the given group communication session.

129. The non-transitory computer-readable storage medium of claim 127, wherein the given gesture-based command is to achieve a state whereby the UE is the floor-holder of the given group communication session.

130. The non-transitory computer-readable storage medium of claim 43, wherein the one or more sensors include at least one of (a) a light sensor, (b) a pressure sensor, (c) a gyroscopic sensor, (d) an accelerometer, (e) a touch-screen proximity sensor, (f) a fingerprint sensor and (g) a haptic sensor.

131. The non-transitory computer-readable storage medium of claim 43, wherein the processor-executable instructions are configured to cause the processor of a user equipment (UE) to perform operations such that detecting that the user has made the second pre-defined gesture further comprises:
comparing sensor data measured by the one or more sensors with sensor data profiles associated with the at least one second pre-defined gesture; and
determining, based on the comparison, that the measured sensor data matches the second pre-defined gesture from among the at least one pre-defined gestures.

132. The non-transitory computer-readable storage medium of claim 131, wherein the sensor data profile for the at least one second pre-defined gesture is defined by the user during a learning mode of the UE prior to the given group communication session.

133. The non-transitory computer-readable storage medium of claim 131, wherein the sensor data profile for the at least one second pre-defined gesture is preset in association with a multimedia client configured to manage the given group communication session at the UE.

134. The non-transitory computer-readable storage medium of claim 131, wherein the at least one second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

135. The non-transitory computer-readable storage medium of claim 43, wherein the second pre-defined gesture includes at least one of (a) the user flicking his/her wrist while holding the UE, (b) the user walking or jogging with the UE, (c) the user picking up the UE from a surface or storage location, (d) the user placing the UE onto a surface or into a storage location, (e) the user shaking the UE, and (f) a proximity of the user's fingers being close to a display of the UE.

136. The non-transitory computer-readable storage medium of claim 43, wherein the given group communication session corresponds to one of a push-to-talk (PTT) session, a push- to-transfer (PTX) session, a half-duplex session, a full-duplex session and a Voice-over Internet Protocol (VoIP) session.

* * * * *